(12) United States Patent
Dong et al.

(10) Patent No.: US 11,545,830 B2
(45) Date of Patent: Jan. 3, 2023

(54) SYSTEMS AND METHODS OF HIERARCHICAL FORECASTING OF SOLAR PHOTOVOLTAIC ENERGY PRODUCTION

(71) Applicants: Bing Dong, Helotes, TX (US); Zhaoxuan Li, San Antonio, TX (US)

(72) Inventors: Bing Dong, Helotes, TX (US); Zhaoxuan Li, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 808 days.

(21) Appl. No.: 15/874,145

(22) Filed: Jan. 18, 2018

(65) Prior Publication Data
US 2018/0203160 A1    Jul. 19, 2018

Related U.S. Application Data (60) Provisional application No. 62/447,575, filed on Jan. 18, 2017.

(51) Int. Cl.
| | |
|---|---|
| G01W 1/11 | (2006.01) |
| H02J 3/38 | (2006.01) |
| H02S 40/32 | (2014.01) |
| H02M 3/156 | (2006.01) |
| G06Q 50/06 | (2012.01) |
| H02J 3/00 | (2006.01) |
| G01W 1/10 | (2006.01) |

(52) U.S. Cl.
CPC ............. *H02J 3/004* (2020.01); *G01W 1/10* (2013.01); *G06Q 50/06* (2013.01); *H02J 3/381* (2013.01); *H02M 3/156* (2013.01); *H02S 40/32* (2014.12); *H02J 2300/24* (2020.01)

(58) Field of Classification Search
CPC .......... G01W 1/10; H02J 3/383; G06Q 50/06; H02M 3/156; H02S 40/32
See application file for complete search history.

(56) References Cited

U.S. PATENT DOCUMENTS

| | | |
|---|---|---|
| 8,396,694 B2 | 3/2013 | Le Pivert |
| 8,942,959 B2 | 1/2015 | Zhang et al. |
| (Continued) | | |

FOREIGN PATENT DOCUMENTS

| | | |
|---|---|---|
| WO | WO2014117659 A1 | 8/2014 |
| WO | WO2015157643 A1 | 10/2015 |

OTHER PUBLICATIONS

Li et al, Hierarchical Approach Using Machine Learning Methods in Solar Photovoltaic Energy Production Forecasting, 2016, Energies. (Year: 2016).*

(Continued)

*Primary Examiner* — Andrew Schechter
*Assistant Examiner* — Jeremy A Delozier
(74) *Attorney, Agent, or Firm* — Thomas | Horstemeyer, LLP (57) ABSTRACT

A photovoltaic system can include multiple photovoltaic power inverters that convert sunlight to power. An amount of power for each of the inverters can be measured over a period of time. These measurements, along with other data, can be collected. The collected measurements can be used to generate artificial neural networks that predict the output of each inverter based on input parameters. Using these neural networks, the total solar power generation forecast for the photovoltaic system can be predicted.

19 Claims, 9 Drawing Sheets

(56) References Cited

U.S. PATENT DOCUMENTS

| | | |
|---|---|---|
| 9,053,439 B2 | 6/2015 | Marwah et al. |
| 2005/0039787 A1 | 2/2005 | Bing |
| 2011/0276269 A1* | 11/2011 | Hummel ................. H02J 3/383 |
| | | 702/3 |
| 2011/0282514 A1* | 11/2011 | Ropp ...................... G01W 1/10 |
| | | 700/297 |
| 2011/0307109 A1 | 12/2011 | Sri-Jayantha |
| 2012/0166085 A1 | 6/2012 | Gevorkian |
| 2015/0094969 A1 | 4/2015 | Jungerman |
| 2015/0188415 A1* | 7/2015 | Abido .................. H02M 3/005 |
| | | 307/103 |
| 2016/0005522 A1* | 1/2016 | Dagnino .............. G05B 13/027 |
| | | 700/291 |
| 2016/0329857 A1* | 11/2016 | Du ......................... H02S 30/10 |

OTHER PUBLICATIONS

Li, Zhaoxuan, et al., "A hierarchical approach using machine learning methods in solar photovoltaic energy production forecasting." Energies 9.1 (2016): 55.

* cited by examiner

SYSTEMS AND METHODS OF HIERARCHICAL FORECASTING OF SOLAR PHOTOVOLTAIC ENERGY PRODUCTION

BACKGROUND

With the development of photovoltaic (PV) or other similar technologies in recent years, renewable energy sources have been used more frequently across the U.S. and worldwide. Policies, such as Renewable Portfolio Standards (RPS), are gaining more and more attention due to the increasing penetration of renewable energy production in the conventional utility grid. As of March of 2015, with 46 states already in use across the country and over 100 RPS bills pending, deciding how to best promote solar energy to compete with other major players in the renewable source market is a priority for many solar power producers, utility companies and independent service operators (ISO).

The widespread implementations of solar power systems are impeded by many factors, such as weather conditions, seasonal changes, intra-hour variability, topographic elevation and discontinuous production. Operators need to acquire solar energy production information ahead of the time to counter the operating costs caused by energy reserve requirements or shortage of electricity supplies from PV systems. To fully utilize solar energy, reliable mechanisms to predict solar production are necessary.

BRIEF DESCRIPTION OF THE DRAWINGS

For a more complete understanding of the embodiments and the advantages thereof, reference is now made to the following description in conjunction with the accompanying figures briefly described as follows.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions executed by the processor.

The embodiments described herein are not limited in application to the details set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having" and variations thereof is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein, the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server or cloud computing, and combinations of the above.

Solar power forecast is the "cornerstone" for a reliable and stable solar energy industry. Intra-hour forecasts can be used for monitoring and dispatching purposes while intra-day and day-ahead forecasts can be used for scheduling the spinning reserve capacity and managing the grid operations. Two methods, Artificial Neural Network (ANN) and Support Vector Regression (SVR), can be used for predicting 15-min ahead, hour ahead and 24-hour ahead energy productions from a solar photovoltaic system. A hierarchical approach can be used based on machine learning algorithms. Production data of average power measurements can be collected in fixed increments, such as 15 minute increments. The accuracy of a predictive model can be determined by computing error statistics such as mean bias error (MBE), mean absolute error (MAE), root mean square error (RMSE), relative bias error (rMBE), mean percentage error (MPE), and relative root mean square error (rRMSE). Forecasts for individual inverters can improve the total solar power generation forecast for a PV system.

The forecast of power output, say day-ahead, is a challenging task owing to the dependency of inputs' accuracy. Examples of inputs, also referred to as input parameters, for PV energy output forecasting can include exogenous inputs from the meteorological forecasts and endogenous inputs from the direct system energy outputs, among other inputs. As an example, meteorological forecasts, such as solar irradiance, can be used to predict solar output. Power can be predicted for an entire PV plant in this manner. However, even with the cloud graph from synchronous meteorological satellites, large variability in key parameters, namely diffuse components from the sky hemisphere, can make solar irradiance much less predictable than the temperature. More difficulties exist in large-scale PV systems installed over a wide area with different tile and azimuth angles. An individual parameterized solar model can be used to deal with diverse configurations of PV.

Since it is not possible to take into account all related meteorological forecasts in practical situation, alternative solutions can be developed. Weather forecasts can be adopted by meteorological online services. The solar forecast model can be simplified by exploring different nonlinear modeling tools, such as an artificial neural network. Two types of networks, radial basis function (RBF) and multi-layer perception (MLP), can be utilized to forecast global solar radiation, solar radiation on tilted surface, daily solar radiation, and short term solar radiation. Other techniques can be used to improve the current models for solar radiations and PV productions, such as the minimal resource allocating network, the wavelet neural network, fuzzy logic, and the least-square Support Vector Machine (SVM), among other techniques. PV productions forecasts can be performed based on reduced weather inputs (e.g. no solar irradiance input) or only based on endogenous inputs. PV linear and nonlinear power outputs can be isolated, temporal resolution can be adjusted, and day types can be classified.

As discussed further herein, reduced exogenous inputs without solar irradiance can be used for predicting the PV production output 15-minutes ahead, hour-ahead and 24-hours ahead of time, among other times ahead. The forecast models, developed from Artificial Neural Network and Support Vector Regression respectively, can forecast the power output based on PV's historical record and the online meteorological services. Moreover, an alternative way to forecast total PV output forecast, generated from individual inverter output forecast, can be carried out to compare the baseline performance using the total PV output data. The accuracy of common forecast techniques can be assessed in order to determine a baseline performance for different prediction windows (e.g. 15 min. ahead, 1 hour ahead, and 24 hours ahead). A hierarchical forecast approach using the monitored information on inverter level can be used to predict PV productions. The hierarchical forecast approach can be validated by comparing with the baseline forecasts.

Two machine learning methods are discussed herein to forecast the power plant output, but other machine learning methods can be used. In one embodiment, the forecast can be calculated 15 minutes ahead, 1 hour ahead, and 24 hours head of time. Artificial Neural Network (ANN) and Support Vector Regression (SVR) can be used for the machine learning methods.

Neural Network is heuristically developed from the human brain's learning processes on recognizing visualized objects. Similar to neurons in a biological brain, ANN can be operated on many different artificial neurons. The structure is a network model connecting the input, hidden, and output layers constructed with neuron nodes. Assumptions do not need to be made about the inputs or outputs of the model. The users can define the model structure such as the number of hidden layers, the number of neurons in each layer, and the appropriate learning algorithms, and perform the model. Inputs to a neuron can be external stimuli or direct outputs from the other neurons. Neurons calculate the weight sum of the inputs and produce the output by transfer functions:

$$f(x) = \sum_{j=1}^{N} w_j \phi_j \left[ \sum_{i=1}^{M} w_{ij} x_i + w_{io} \right] + w_{jo} \quad (1)$$

Where w is the weights for input, hidden, and output layers, x is the training input, $f(x)$ is the training output, N represents the total number of hidden neurons, M represents the total number of inputs, and $\phi$ represents the transfer function for each hidden neuron. The weighted sums can be adjusted during training processes by minimizing the errors of the training data, namely Mean Squared Error, Sum Squared Error and Root Mean Squared Error. Numerical learning algorithms, such as back-propagation, quasi-Newton and Levenberg-Marquardt, can be used to effectively optimize the weights.

Figure 1:
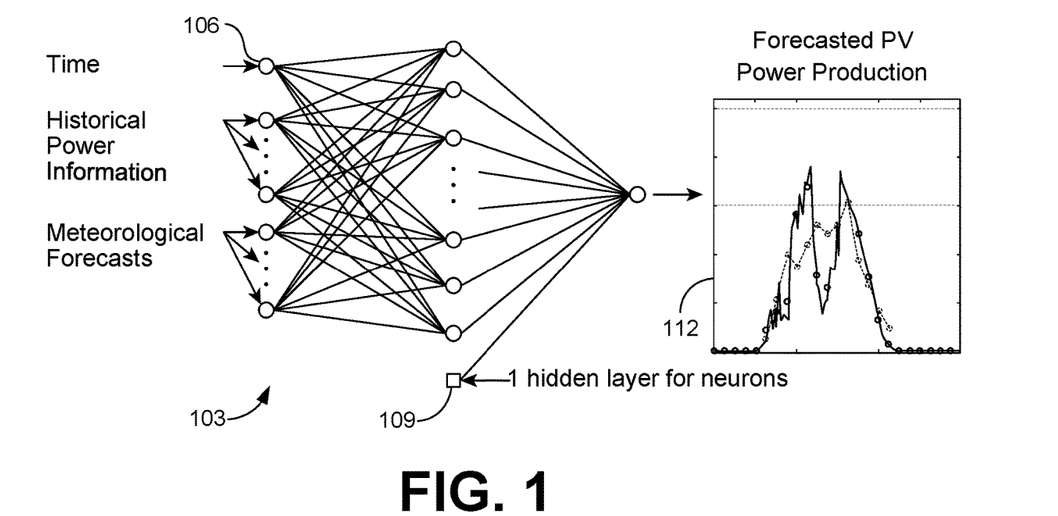
FIG. 1 is a drawing of an artificial neural network structure according to various example embodiments.

With reference to FIG. 1, shown is a feed forward neural network (FFNN) 103. The FFNN 103 can include one or more inputs 106 and one or more hidden layers for neurons 109. The FFNN 103 can produce a forecasted PV output 112 for power production. The FFNN 103 can output the forecasted PV output 112 based on the inputs 106 and the hidden layers 109.

FFNN 103 of a single layer and a double layer configuration can be used. However, due to an over-fitting problem, good forecasts were not found from the double hidden layer structure. The performance of FFNN 103 depends strongly on the parameter settings. In one embodiment, FFNN can be modeled as 1 hidden layer 109 with more than 20 neurons, 1 output neuron (the prediction of power production, e.g. forecasted PV output 112), and 26 input neurons 106 (several time lagged values of historical power productions, meteorological inputs, and time information). A simplified diagram of the FFNN 103 is shown in FIG. 1.

In one embodiment, the model can be implemented in Python. The transfer functions can be the hyperbolic tangent sigmoid functions for each layer. FNNN 103 can be trained with a gradient descent back-propagation algorithm. FFNN's 103 weights can be learned by minimizing Sum Squared Error (SSE). To select the specific number of hidden neurons, the training algorithms can be performed on multiple epochs of historical data. As an example, for each epoch selected (e.g. one week), 75% of the data can be used for training and the rest of the 25% can be held out for validation. Other ratios can also be used. The parameter can be normalized. As an example, the parameters can be optimized using all input data normalized between 0 to 1. In one example, at least 50 epochs are simulated until the calculated SSE reaches the setting error goal of 0.001.

Support vector machines are statistics learning tools that can be used in classification and regression. For support vector regression (SVR), a data set can be transformed into a high dimension space. Predictions can be discriminated from training data as a "tube" enclosed with a desired pattern curve with certain tolerances. The support vectors are the points which mark the margins of the tube. The SVR approximates the inputs and outputs using the following form:

$$f(x) = w\varphi(x) + b \quad (2)$$

where $\varphi(x)$ represents the transfer function mapping the input data to the high dimensional feature spaces. Parameters w and b are estimated by minimizing the regularized risk function:

$$\min \frac{1}{2} w^T \cdot w + C \sum_{i=1}^{n} (\xi_i + \xi_i^*) \quad (3)$$

$$\text{s.t.} \quad y_i - w^T \varphi(x_i) - b \le \varepsilon + \xi_i$$

$$w^T \varphi(x_i) - b - y_j \le \varepsilon + \xi_i^*$$

Where w represents the total number of training samples, $\xi$ is the error slacks guaranteeing the solutions, C is the regularized penalty, $\varepsilon$ defines the desired tolerance range of the "tube", and $\varphi$ is the kernel mapping function. The first term $w^T \cdot w$ is a regularized term to flatten the function in Eq. (2). The second term is the empirical error measured by the $\varepsilon$-insensitive loss function. This loss function defines the $\varepsilon$ tube: if the forecasted values are within the tube, the loss is zero; if the forecasted values are outside the tube, the loss is proportional to the absolute differences between the forecasted values and the radius $\varepsilon$ of the tube.

Both $\varepsilon$ and C are optimized by introducing Lagrange multiplier and exploiting the optimality constraints. The equivalent Lagrangian form of Eq. (2) is expressed by the following equation:

$$f(x) = \sum_{i=1}^{n} (a_i - a_i^*) K(x_i, x_j) + b \quad (4)$$

Where $K(x_i, x_j)$ is defined as the kernel function. In Eq. (4), $a_i$ and $a_i^*$ are the so-called Lagrange multipliers. The Lagrange multipliers can be calculated by solving the dual problem of Eq. (3) in Lagrange form. The advantage of using the kernel function is that one can deal with feature space in arbitrary dimension without explicitly computing the map $\varphi$ in Eq. (3). Any function that satisfies Mercer's condition can be used as the kernel function. The commonly used choices are linear, polynomial, and radial basis function (RBF). In general, RBF with weight parameter $\gamma$ tends to give good performance by smoothness. The RBF is defined as follows:

$$f(x_i, x_j) = \exp\left(-\frac{\|x_i - x_j\|^2}{\gamma}\right) \quad (4)$$

where $\gamma$ is the kernel parameter.

The RBF used can be a 3-degree kernel function. The SVR model can be found relatively insensitive to the value of $\varepsilon$ which is smaller than 0.01 whereas both C and $\gamma$ necessitate independent tuning. These parameters are determined with 10-fold cross-validation based on mean square error. The grid search scale for C and $\gamma$ is maintained between $10^3$ and $10^{-3}$.

As shown in FIG. 1, any historical information of the power productions can be fed to the machine learning methods as the inputs 106. The forecasting of the power plant production (forecasted PV output 112) can use the information of the total power plant production from historical record to train the models. Parameters of the machine learning models can be manipulated to get better predictions. However, different feeding information from historians could change the results, especially for a large PV plant. The difficulties of accessing and measuring the data can contribute to why production information in the micro level is typically neglected. However, the abundant information from the micro level of PV (e.g. inverters) can facilitate a new hierarchical view in forecasting the power output from the large PV system. The hierarchical forecasting approach, utilizing the machine learning tools at a micro level for each inverter prediction and evaluating the performances at a macro level for the whole plant by summing up the forecasts, is shown in FIG. 2.

Figure 2:
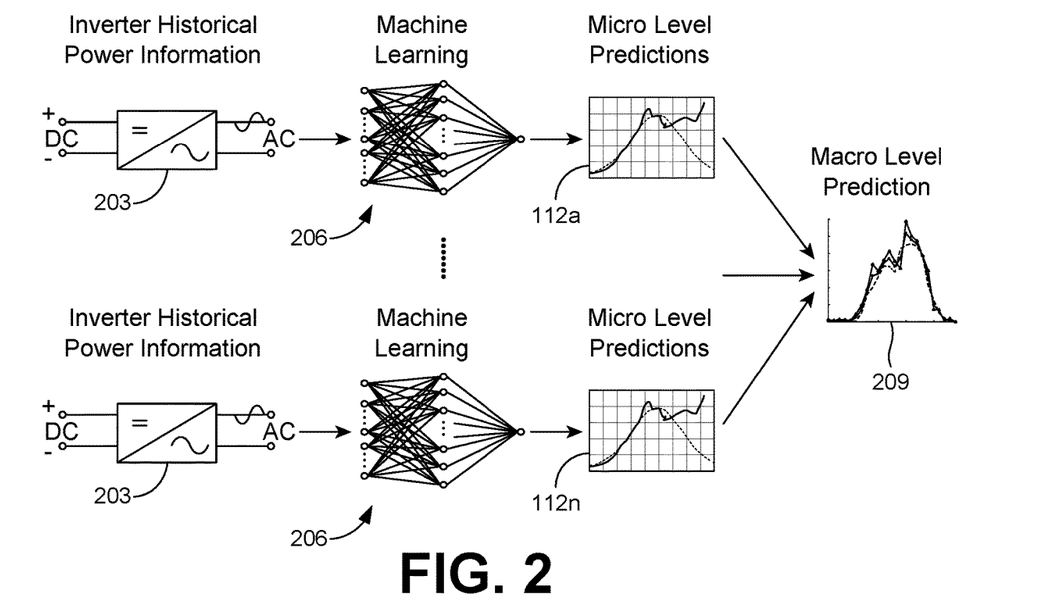
FIG. 2 illustrates a hierarchical approach accordingly to various example embodiments.

With reference to FIG. 2, shown is a hierarchical approach 200 of forecasting power output for a PV system. The hierarchical approach can include historical information 203 from one or more PV power inverters of the PV system. The historical information 203 for each of the PV power inverters can be processed by a corresponding neural network 206, such as, for example, a FNNN 103. The neural network 206 can produce forecasted PV outputs 112a-112n for each of the neural network 206. The hierarchical approach can include summing the forecasted PV outputs 112a-112n to determine a macro level forecasted PV output 209 for the PV system. Each of the neural network 206 can be generated based on average power productions from the historical information 203 over a period of time for a corresponding inverter. The neural networks 206 can be generated based in part on a machine learning algorithm.

Performances of the techniques discussed can be evaluated by several error calculations. For test samples at the night time hours, i.e. when solar irradiance is not available, there is no need to evaluate the system performances. Forecast accuracy can be evaluated using the following common statistical metrics:

Mean Bias Error (MBE)

$$MBE = \frac{1}{N} \sum_{i=1}^{N} (P_i - \hat{P}_i) \quad (5)$$

Mean Absolute Error (MAE)

$$MAE = \frac{1}{N} \sum_{i=1}^{N} |P_i - \hat{P}_i| \quad (6)$$

Root Mean Square Error (RMSE)

$$RMSE = \sqrt{\frac{1}{N} \sum_{i=1}^{N} (P_i - \hat{P}_i)^2} \quad (7)$$

where $P_i$ is the measured power output, $\hat{P}_i$ is the forecasting for $P_i$, and N represents the number of data points which the forecast errors are calculated. MBE is used to estimate the bias between the expected value from predictions and the ground truth. In comparison, MAE provides a view on how close the forecasts are to the measurements in absolute scale. The last one, RMSE, amplifies and severely punishes large errors by using the square form. Although these performance metrics are popular and considered as the standard performance measures, limitations with MAE, MBE and RMSE involve the relative sizes of the reported errors not being obvious. It is hard to tell whether the errors are big or small in comparison to different series of data in different scales. Hence, relative error measures are further introduced below:

Relative Mean Bias Error (rMBE)

$$rMBE = \frac{\frac{1}{N}\sum_{i=1}^{N} P_i - \hat{P}_i}{\overline{P}} \quad (8)$$

Mean Percentage Error (MPE)

$$MPE = \frac{|P_i - \hat{P}_i|}{M} \quad (9)$$

Relative Root Mean Squared Error (rRMSE)

$$rRMSE = \frac{\sqrt{\frac{1}{N}\sum_{i=1}^{N} (P_i - \hat{P}_i)^2}}{\overline{P}} \quad (10)$$

where M is the maximum power production is recorded, and $\overline{P}$ is the mean value of solar PV energy production during the daytime in the test period. $\overline{P}$ is calculated from the below equation:

$$\overline{P} = \frac{1}{N}\sum_{i=1}^{N} P_i \quad (11)$$

In one exemplary test, data was collected from a 6 MW (DC) peak solar power plant with eleven 500 kW (AC) inverters located in Florida. This solar farm's tested period spanned from Jan. 1, 2014 to Dec. 31, 2014. The intra hour ground truth data collected from the PV plant site was transferred to 15 mins and hourly average of power output. Before applying the training algorithm, both the input and output data were normalized to the range from 0 to 1 using the following equation:

$$y_i^* = \frac{y_i - y_{min}}{y_{max} - y_{min}} \quad (14)$$

where $y_i$ is the original data value, $y^*_i$ is the corresponding normalized value, $y_{min}$ is the minimum value in $y_i$ data set, and $y_{max}$ is the maximum value in $y_i$ data set.

To train the models for different forecasting windows, a determination of what inputs perform the best at predicting the PV output can be made. The training process can be facilitated by testing different configurations of historical power production information. The inputs for the 15-min and 1 hour ahead forecast, defined as H1, can be a Markov order 5 sequence as follows:

$$H1: f(L_{t-1}, t_{t-2}, \ldots, L_{t-5}) \quad (12)$$

where $L_{t-1}$ represents historical power plant production from the previous one-time step back, . . . , and $L_{t-5}$ represents production from the previous five time steps back. The 24-hour ahead input set, defined as H2, is used to forecast the next 24-hour power production. For one future hour power production $L_t$ of the next 24-hour window, the input features selected are:

$$H2: f(L_{t-24}, L_{t-48}, L_{t-72}, \ldots, L_{t-168}) \quad (13)$$

For a one-time step ahead forecast (the 15-min and 1 hour ahead forecast), inputs include the historical power productions from 1 to 5 time steps back. By comparison, the 24-hour ahead forecast needs the historical outputs at the same time from yesterday, the day before yesterday, and the day before one week. These features are selected based on an exhaustive search by minimizing coefficient of determination.

On the other hand, the reduced exogenous inputs are the following physical variables from weather services that no lag effect is considered: ambient temperature, wind speed, and wind direction. Additional variables are also tried from the NREL SOLPOS as an indirect source to enhance the clear-sky PV production forecast. In the example case, the following variables were found useful: 1) solar zenith angle, no atmospheric correction; 2) solar zenith angle, degrees from zenith, refracted; 3) cosine of solar incidence angle on panel; 4) cosine refraction corrected solar zenith angle; 5) solar elevation (no atmospheric correction), and 6) solar elevation angle (degrees from horizon, refracted). Various combinations of these variables can be used individually to help to improve the forecasts of different scenarios. It depends on the forecast windows, and these are all the possible variables that can be used. In essence, these additional inputs are adopted as indicators to the clear-sky solar irradiance without explicitly predicting the irradiances. The assumption is that the machine learning algorithms will learn the nonlinear relationship between clear-sky solar properties and the PV plant productions directly rather than through the solar irradiance predictions.

The forecast techniques, ANN and SVR, were tested on the total power production forecast of the sample PV plant. The baseline forecast uses whole plant production information. It only implements one machine learning model trained with the plant data for power production prediction. The hierarchical way predicts the power production from PV inverters while each inverter production forecast uses a different machine learning model, which is trained separately based on the information provided by the corresponding inverter. The summation of these inverter forecasts can convert the micro level predictions to a macro level forecast standing for total PV plant production. Tables 1 to 3 present forecast results in year 2014 for different prediction windows using both approaches. Best results from different error matrixes are highlighted. The hierarchical approach, whether using ANN or SVR, performs better in one step ahead forecast than the traditional way. The 24-hour ahead case is fairly even between the two approaches, as it is difficult to implement the machine learning algorithms in longer forecast windows, shown by the larger MAE, RMSE and MPE comparing to hour ahead forecast results.

TABLE 1

15-min ahead forecast result for the whole PV plant.

| Endogenous input | Model | MBE (KWh) | MAE (KWh) | RMSE (KWh) | rMBE | rRMSE | MPE |
|---|---|---|---|---|---|---|---|
| Inverters | ANN | 0.49 | 34.57 | 42.15 | 0.0131 | 0.131 | 4.32 |
| | SVR | 0.58 | 35.73 | 43.52 | 0.0132 | 0.133 | 4.34 |
| Whole plant | ANN | 0.54 | 35.85 | 43.67 | 0.0135 | 0.132 | 4.31 |
| | SVR | 0.51 | 36.21 | 45.70 | 0.0132 | 0.135 | 4.31 |

TABLE 2

Hour ahead forecast result for the whole PV plant.

| Endogenous input | Model | MBE (KWh) | MAE (KWh) | RMSE (KWh) | rMBE | rRMSE | MPE |
|---|---|---|---|---|---|---|---|
| Inverters | ANN | 0.50 | 51.56 | 63.62 | 0.0128 | 0.134 | 4.32 |
| | SVR | 0.55 | 50.77 | 66.87 | 0.0131 | 0.136 | 4.34 |
| Whole plant | ANN | 0.53 | 52.23 | 65.45 | 0.0134 | 0.135 | 4.31 |
| | SVR | 0.57 | 54.69 | 65.43 | 0.0131 | 0.135 | 4.31 |

TABLE 3

24-hour ahead forecast result for the whole PV plant.

| Endogenous input | Model | MBE (KWh) | MAE (KWh) | RMSE (KWh) | rMBE | rRMSE | MPE |
|---|---|---|---|---|---|---|---|
| Inverters | ANN | 0.03 | 126.32 | 182.64 | 0.0001 | 0.410 | 10.54 |
| | SVR | 0.05 | 134.48 | 185.44 | 0.0002 | 0.410 | 10.53 |
| Whole plant | ANN | −0.07 | 128.77 | 183.49 | 0.0012 | 0.412 | 10.51 |
| | SVR | 0.01 | 126.89 | 185.67 | 0.0002 | 0.411 | 10.52 |

Figure 3A:
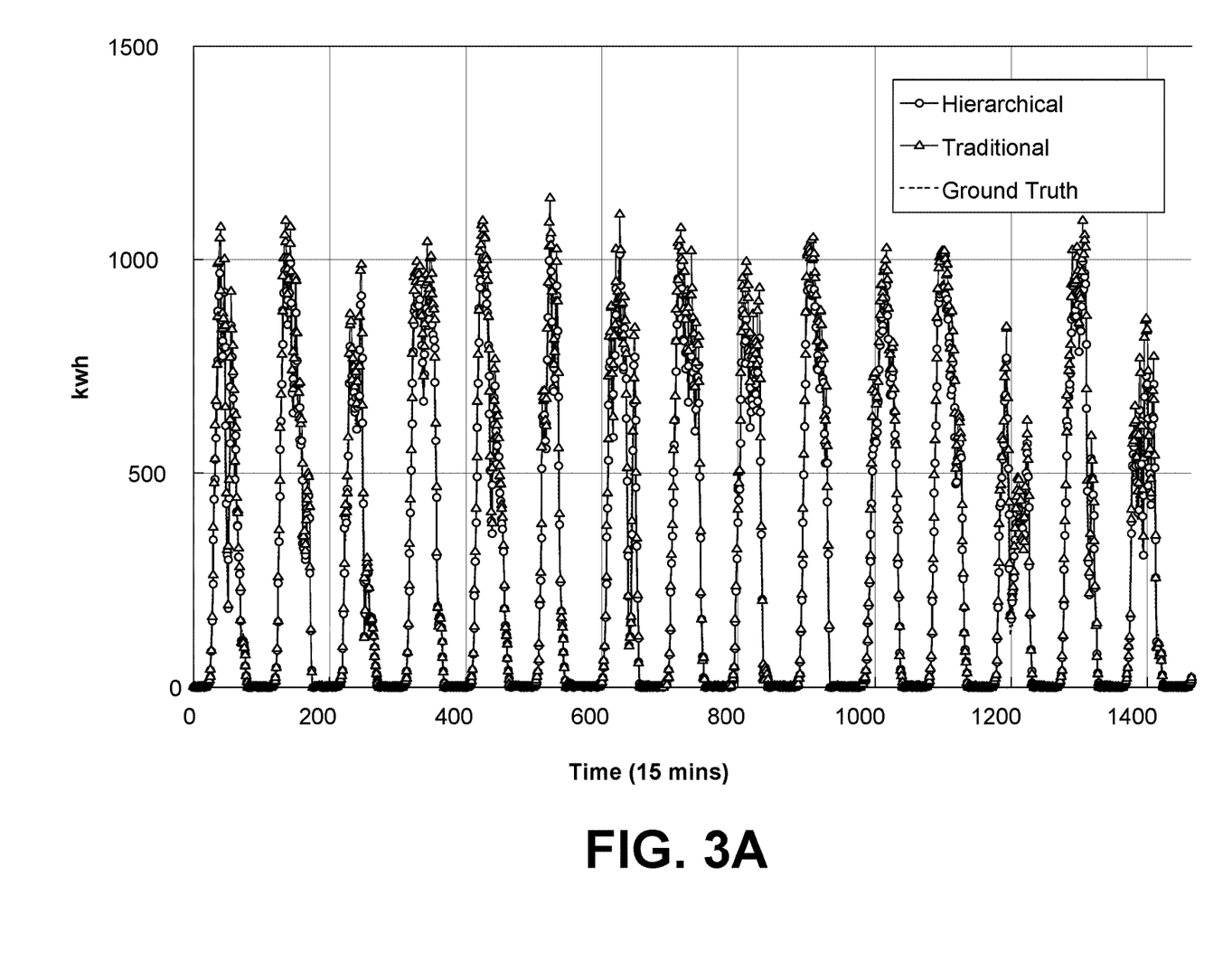
FIGS. 3A-3C illustrate example plots of forecast results according to various example embodiments.
Figure 3B:
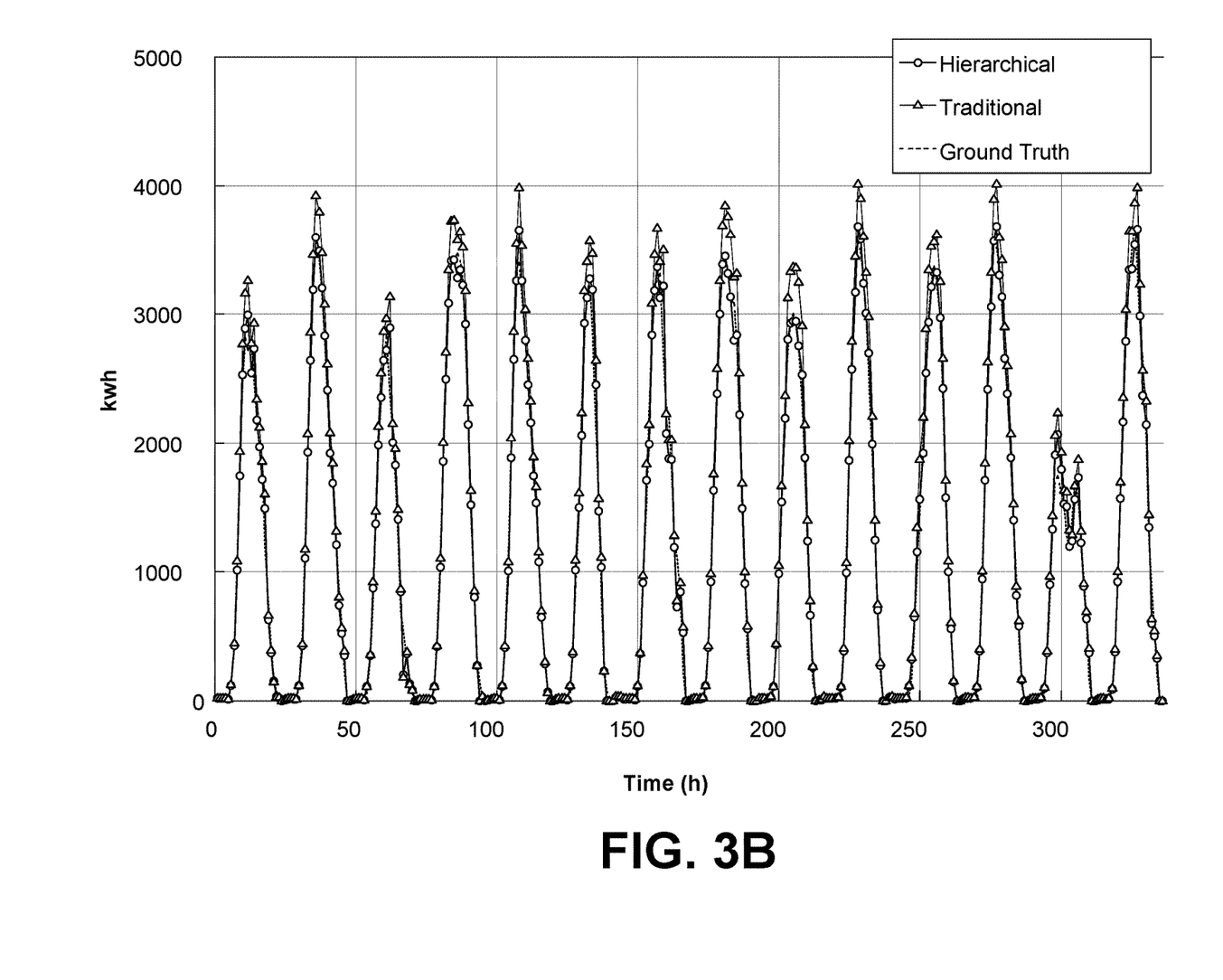
Figure 3C:
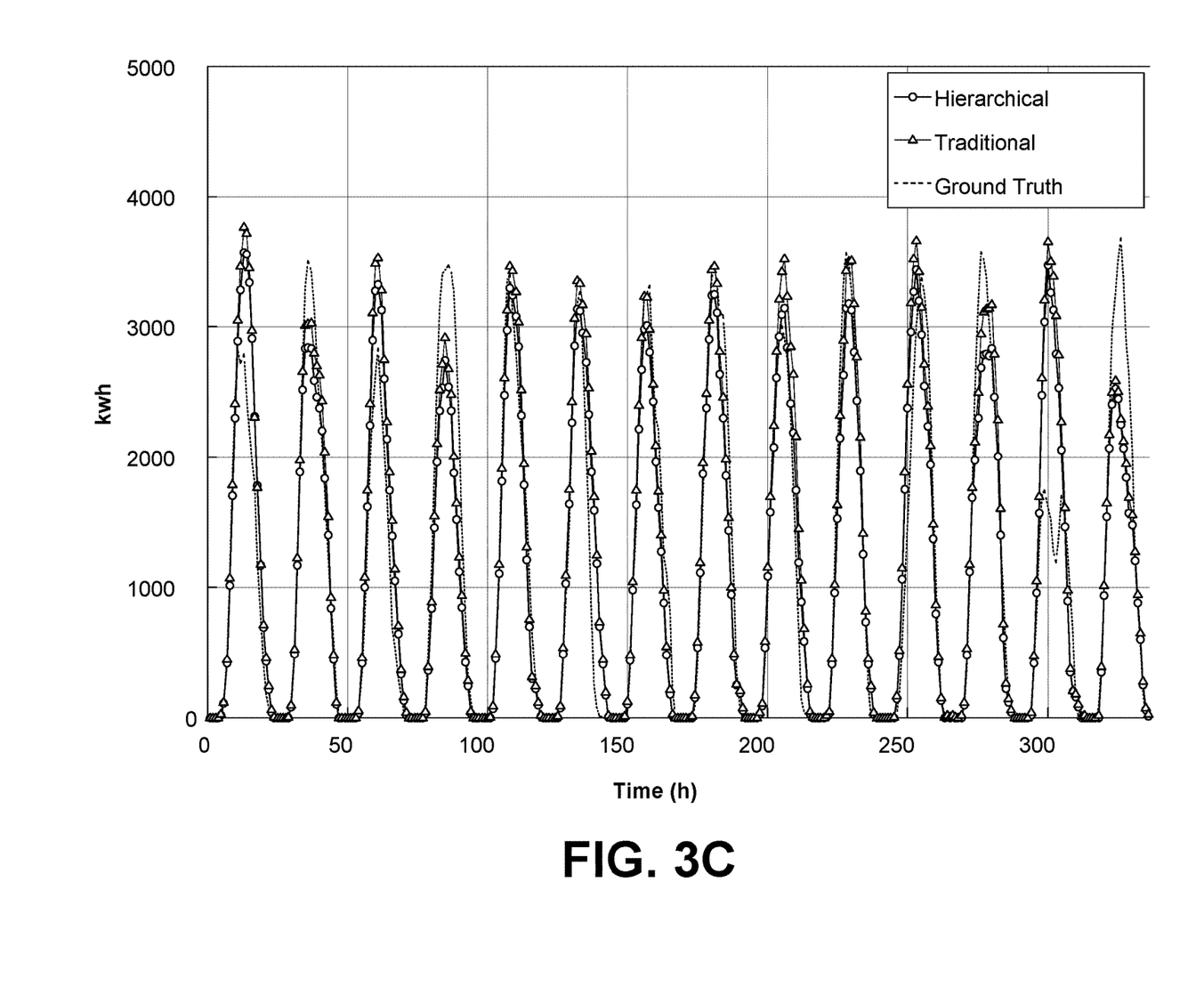
Figure 4A:
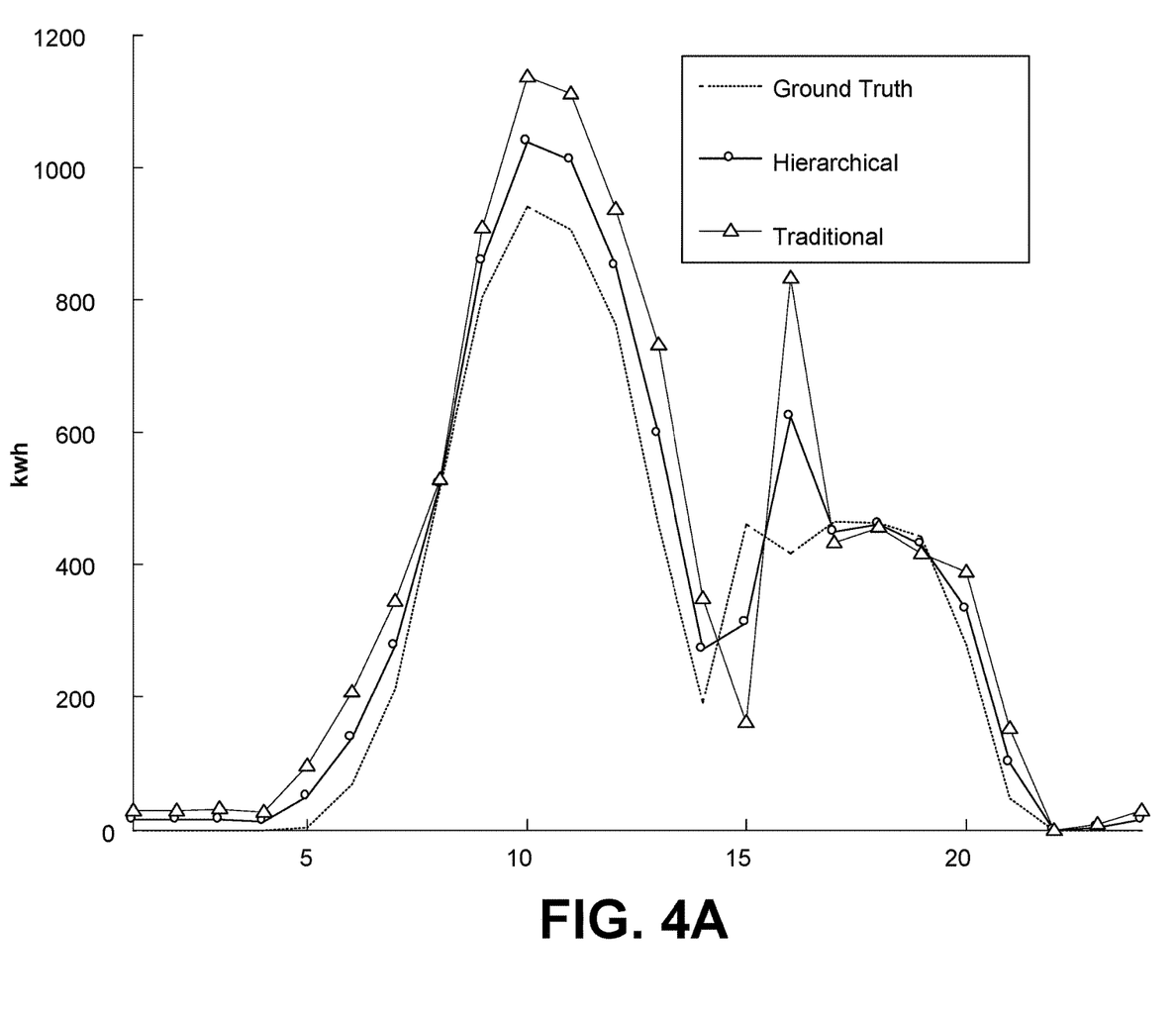
FIGS. 4A and 4B illustrate example plots of forecast results according to various example embodiments.
Figure 4B:
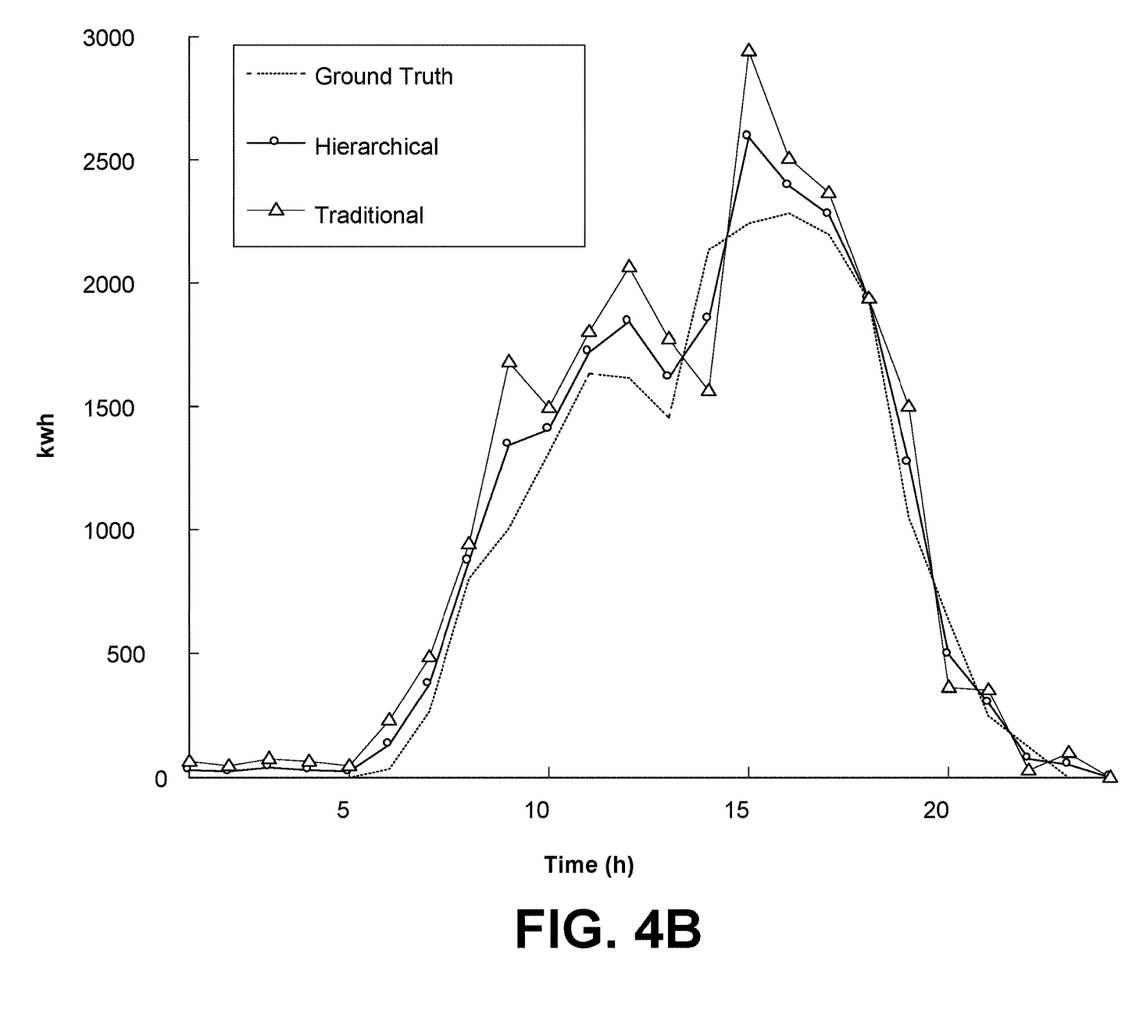

FIGS. 3A-3C and FIGS. 4A and 4B display the forecast results by comparing the traditional method and the hierarchical approach using the same machine learning technique, such as ANN. In FIGS. 3A-3C, the presented two-week period shows improvements of performances using a hierarchical approach for 15-min ahead, hour ahead and 24-hour ahead forecasts respectively. In particular, some strikingly different results are observed for 24-hour ahead cases in comparison to the consistent performances for 15-min and hour ahead forecasts, which are the one-time step ahead cases. Power production forecasting plots in FIG. 3A and FIG. 3B, even in the cloudy day (around 1,200 time steps in 15-min ahead plot and 300 time steps in hour ahead plot), match the ground truth pattern with a low error. In contrast, the same case in the 24-hour ahead forecast apparently excessively predicts the true power production. The dampened performance for the 24-hour ahead case is clearly influenced by the input features. In the 24-hour ahead forecast, models learned the patterns as a daily profile, which is a 24 time steps ahead moving window. The key assumption behind the learning process is that daily power plant productions are similar without large deviation, which may not be the case for all days. That is why cloudy or rainy weather plays a more important role than historical power production information in 24-hour ahead cases. However, due to the goals and definitions of the approaches, the factors cannot be easily approximated from the reduced exogenous inputs in this disclosure. Besides the 24-hour tests, 15-min and hour ahead predictions actually do not depend too much on exogenous inputs. Sample plots for rainy and cloudy days' forecasts in FIG. 4 indicate that the trained model with endogenous inputs can predict the plant power production for one-time step ahead cases on an appropriate error level. In the cloudy day, the production level of energy is affected by the cloudy periods, and changes can be observed during 10 am to 3 pm in FIG. 4B. In comparison, the rainy day has more irregular productions in the whole daytime and more periods are either over-fitted or under-estimated (e.g. the periods from 2 pm to 4 pm in FIG. 4A).

TABLE 4

15-min ahead forecast result for each inverter.

| Inverter | MBE (KWh) | MAE (KWh) | RMSE (KWh) | rMBE | rRMSE | MPE | Max energy (KWh) |
|---|---|---|---|---|---|---|---|
| A1 | −0.57 | 4.95 | 6.15 | 0.0124 | 0.134 | 4.36 | 113.4 |
| A2 | −0.55 | 5.06 | 6.27 | 0.0118 | 0.134 | 4.39 | 113.15 |
| B1 | −0.52 | 4.93 | 6.13 | 0.0112 | 0.131 | 4.39 | 110.45 |
| B2 | −0.39 | 5.03 | 6.24 | 0.0083 | 0.133 | 4.45 | 111.16 |
| C1 | 0.42 | 4.91 | 6.11 | 0.0119 | 0.133 | 4.42 | 110.45 |
| C2 | 0.51 | 4.97 | 6.19 | 0.0126 | 0.133 | 4.37 | 109.75 |
| D1 | 0.45 | 5.09 | 6.21 | 0.0133 | 0.134 | 4.46 | 110.5 |
| D2 | 0.56 | 5.14 | 6.15 | 0.0148 | 0.132 | 4.41 | 110.25 |
| E1 | −0.57 | 4.96 | 6.18 | 0.0134 | 0.131 | 4.36 | 112.89 |
| E2 | 0.43 | 5.07 | 6.22 | 0.0127 | 0.131 | 4.43 | 112.5 |
| E3 | 0.44 | 5.03 | 6.26 | 0.0131 | 0.134 | 4.37 | 114.2 |

TABLE 5

Hour ahead forecast result for each inverter.

| Inverter | MBE (KWh) | MAE (KWh) | RMSE (KWh) | rMBE | rRMSE | MPE | Max energy (KWh) |
|---|---|---|---|---|---|---|---|
| A1 | 0.59 | 4.55 | 5.58 | 0.0146 | 0.139 | 4.08 | 446 |
| A2 | 0.48 | 4.69 | 5.74 | 0.0118 | 0.140 | 4.14 | 452.6 |
| B1 | 0.44 | 4.62 | 5.63 | 0.0107 | 0.137 | 4.18 | 441.8 |
| B2 | 0.47 | 4.71 | 5.74 | 0.0114 | 0.140 | 4.24 | 444.64 |
| C1 | 0.49 | 4.75 | 5.55 | 0.0127 | 0.135 | 4.19 | 441.8 |
| C2 | 0.55 | 4.63 | 5.62 | 0.0119 | 0.140 | 4.26 | 439 |
| D1 | 0.43 | 4.62 | 5.72 | 0.0125 | 0.139 | 4.19 | 442 |
| D2 | 0.52 | 4.59 | 5.67 | 0.0141 | 0.138 | 4.20 | 441 |
| E1 | 0.58 | 4.58 | 5.56 | 0.0135 | 0.137 | 4.16 | 451.56 |
| E2 | 0.50 | 4.68 | 5.63 | 0.0133 | 0.138 | 4.22 | 450 |
| E3 | 0.55 | 4.70 | 5.66 | 0.0129 | 0.136 | 4.21 | 456.8 |

TABLE 6

24-hour ahead forecast result for different number of inverters.

| Inverter | MBE (KWh) | MAE (KWh) | RMSE (KWh) | rMBE | rRMSE | MPE | Max energy (KWh) |
|---|---|---|---|---|---|---|---|
| 1 | −0.10 | 11.46 | 16.37 | 0.0024 | 0.412 | 10.28 | 446 |
| 2 | −0.21 | 23.39 | 33.13 | 0.0026 | 0.412 | 10.41 | 898.6 |
| 3 | −0.14 | 35.27 | 49.73 | 0.0011 | 0.410 | 10.52 | 1340.4 |
| 4 | −0.25 | 47.19 | 66.40 | 0.0016 | 0.410 | 10.57 | 1785.04 |
| 5 | 0.01 | 58.95 | 83.09 | 0.0001 | 0.412 | 10.59 | 2226.84 |
| 6 | 0.11 | 70.11 | 99.08 | 0.0005 | 0.410 | 10.52 | 2665.84 |
| 7 | 0.06 | 81.96 | 115.80 | 0.0002 | 0.410 | 10.55 | 3107.84 |
| 8 | −0.31 | 93.43 | 132.07 | 0.0010 | 0.411 | 10.53 | 3548.84 |
| 9 | 0.03 | 105.58 | 149.10 | 0.0001 | 0.410 | 10.56 | 4000.4 |
| 10 | 0.11 | 117.27 | 165.70 | 0.0003 | 0.410 | 10.54 | 4450.4 |
| 11 | 0.03 | 126.32 | 182.64 | 0.0001 | 0.410 | 10.54 | |
| Whole plant | −0.07 | 128.77 | 183.49 | 0.0002 | 0.412 | 10.51 | |

Figure 5A:
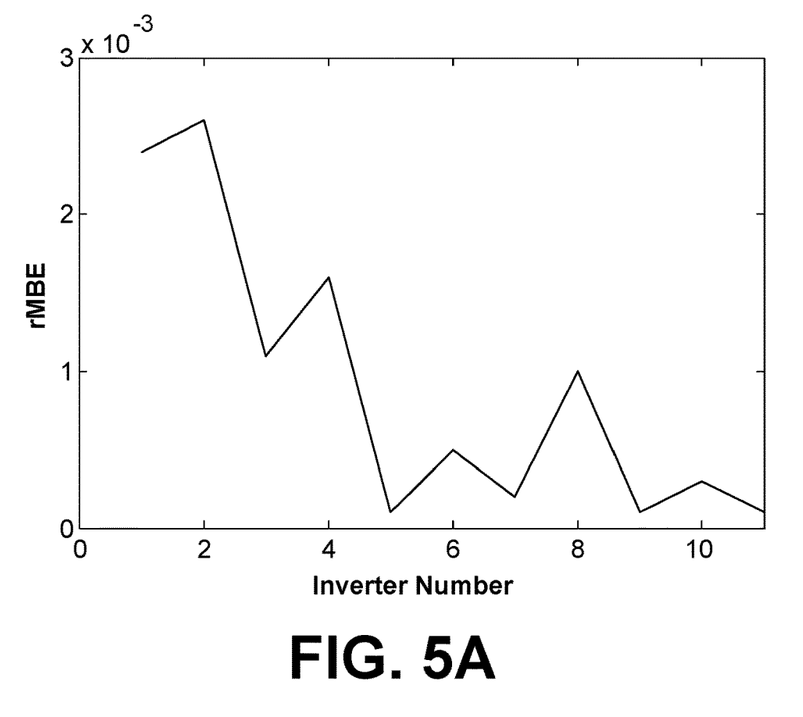
FIGS. 5A and 5B illustrate hierarchical approaches involving evolving errors according to various example embodiments.
Figure 5B:
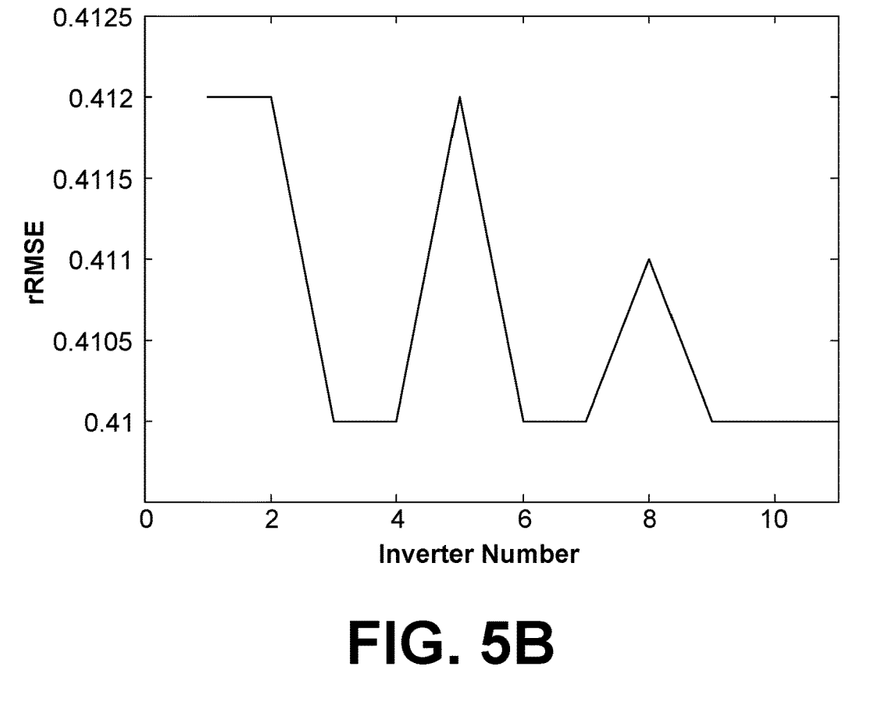

Table 4 and Table 5 list all the inverter values for the 15-min and 1 hour ahead forecast windows using ANN. The classification of the inverter groups is based on plant configuration and areas occupied. The similar size for the plant inverter guarantees a comparative view on which area has the most potential in production predictions and which inverter causes the most trouble in power forecast. Table 6 further illustrates effects of the hierarchical approach during predicting power plant production from the micro level to a macro analysis. In terms of MBE, the unstable errors imply similar chances to overly predict or inadequately predict the power output regardless of the power production levels. The evaluations based on absolute changes, such as MAE, MPE, and RMSE, represent the evolving process when the power production level increases as the max energy shown as well. The gradually improved forecasts are measured by rMBE and rRMSE. By comparing the total summation from 11 inverter predictions and the forecast using the historical power production from whole plant, we can conclude that the hierarchical approach performs better in terms of MBE, MAE, RMSE, rMBE, and rRMSE, which is shown in FIGS. 5A and 5B. The evolving process of the hierarchical approach shows the potential to have multiple levels of forecasts of the PV system that can be used for various purposes, such as optimizations of the production schedules in the inverter level and micro controls for multiple solar modules in a large PV system. FIGS. 5A and 5B show a hierarchical approach in terms of evolving errors. In FIG. 5A, the rMBE method is used, and in FIG. 5B, the rRMSE method is used.

Two models, ANN and SVR, are compared for the 15-min ahead, hour ahead, and 24-hour ahead forecasting of the averaged power output of a 6 MW photovoltaic power plant. In some embodiments, no exogenous data such as solar irradiance was used in the forecasting models. A hierarchical approach using micro level power plant information, such as from inverters, is further assessed. From the analysis of the error between ground truth and predicted values, it can be concluded that hierarchical technique outperforms traditional models using power production information from the micro level of a plant system. In addition, the difference is shown between one step ahead forecast, namely 15-min and hour ahead, and 24-hour ahead forecast using both approaches. The analysis of the evolving errors, calculated by the summation of the different inverter number, shows the potential of the hierarchical approach to determine which smaller PV generation units have the most impact on PV power plant forecasting. A subset of the PV power inverters can be determined based on the evolving errors by selecting the PV power inverters that are predicted to have the greatest impact on PV power plant forecasting.

Figure 6:
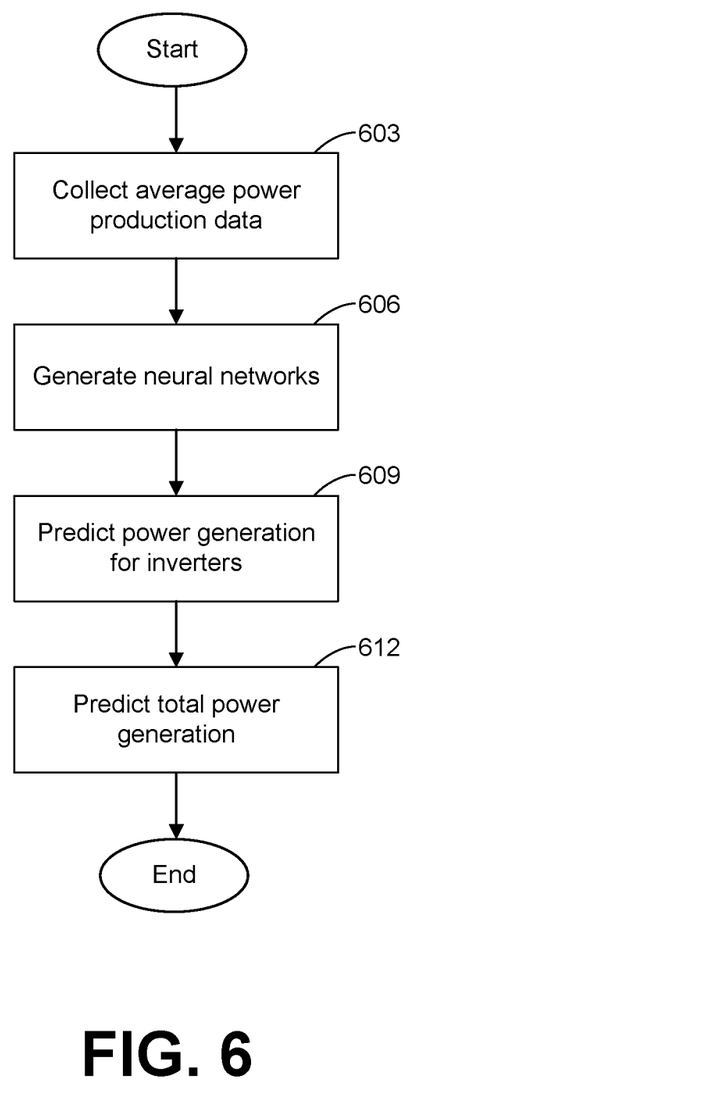
FIG. 6 illustrates an example flowchart of certain functionality executed in a computing environment according to various example embodiments.

Before turning to the process flow diagrams of FIG. 6, it is noted that embodiments described herein may be practiced using an alternative order of the steps illustrated in FIG. 6. That is, the process flows illustrated in FIG. 6 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments.

At box 603, data is collected on average power productions from inverters in a PV system. At box 606, neural networks are generated using the data collected from the PV system. At box 609, the neural networks are used to predict output for each of the inventers using input information. At box 612, the total power for a PV system is predicted by summing up the predicted output from each of the inverters.

Figure 7:
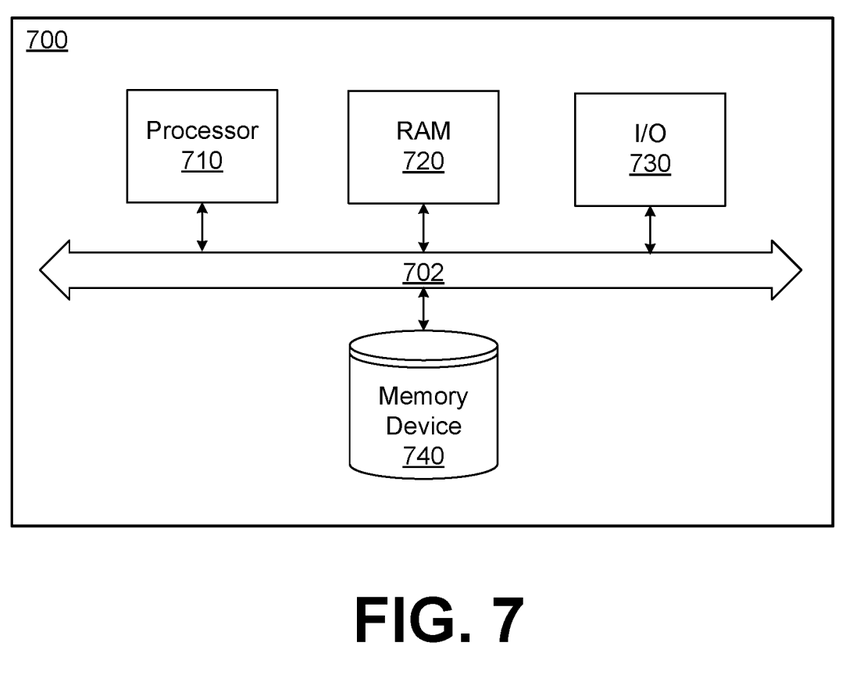
FIG. 7 is a schematic block diagram that illustrates an example computing environment employed according to various embodiments.

Turning to FIG. 7, an example hardware diagram of a general purpose computer 700 is illustrated. Any of the methods of systems discussed herein, in part, can be implemented using one or more elements of the general purpose computer 700. The computer 700 includes a processor 710, a Random Access Memory ("RAM") 720, a Read Only Memory ("ROM") 730, a memory device 740, a network interface 750, and an Input Output ("I/O") interface 760. The elements of the computer 700 are communicatively coupled via a bus 702.

The processor 710 comprises any well-known general purpose arithmetic processor or Application Specific Integrated Circuit ("ASIC"). The RAM and ROM 720 and 730 comprise any well-known random access or read only memory device that stores computer-readable instructions to be executed by the processor 710. The memory device 730 stores computer-readable instructions thereon that, when executed by the processor 710, direct the processor 710 to execute various aspects of the present invention described herein. When the processor 710 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 730 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 750 comprises hardware interfaces to communicate over data networks. The I/O interface 760 comprises device input and output interfaces such as keyboard, pointing device, display, communication, and other interfaces. The bus 702 electrically and communicatively couples the processor 710, the RAM 720, the ROM 730, the memory device 740, the network interface 750, and the I/O interface 760, so that data and instructions may be communicated among them.

In operation, the processor 710 is configured to retrieve computer-readable instructions stored on the memory device 740, the RAM 720, the ROM 730, or another storage means, and copy the computer-readable instructions to the RAM 720 or the ROM 730 for execution, for example. The processor 710 is further configured to execute the computer-readable instructions to implement various aspects and features of the present invention. For example, the processor 710 may be adapted and configured to execute the processes described above with reference to FIG. 6, including the processes described as being performed by the modules of the hierarchical solar power prediction techniques discussed.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A method comprising:
    collecting a plurality of respective average power productions over a period of time from individual ones of a plurality of photovoltaic power inverters of a photovoltaic system;
    generating a plurality of neural networks based at least in part on the plurality of respective average power productions over the period of time for the individual ones of the plurality of photovoltaic power inverters, the plurality of neural networks individually corresponding to the plurality of photovoltaic power inverters; and
    predicting a total solar power generation forecast for the photovoltaic system based at least in part on the plurality of neural networks.

2. The method of claim 1, wherein each of the plurality of neural networks comprises at least one hidden layer.

3. The method of claim 1, wherein the plurality of neural networks are generated based at least in part on a machine learning algorithm.

4. The method of claim 1, further comprising determining at least one input parameter, wherein the total solar power generation forecast for the photovoltaic system is further based at least in part on the at least one input parameter.

5. The method of claim 4, wherein the at least one input parameter comprises at least one of: a time and a meteorological forecast.

6. The method of claim 4, further comprising predicting, for each of the plurality of photovoltaic power inverters, a respective inverter solar power generation forecast using the at least one input parameter, wherein predicting the total solar power generation forecast for the photovoltaic system comprises summing the respective inverter solar power generation forecast for each of the plurality of photovoltaic power inverters.

7. The method of claim 1, wherein the plurality of respective average power productions individually correspond to a respective 15 minute average of power production.

8. The method of claim 1, wherein a respective hourly ahead forecast for each of the plurality of respective average power productions corresponds to a respective hourly average of power production.

9. The method of claim 1, wherein a respective 24 hour ahead forecast for each of the plurality of respective average power productions corresponds to a respective hourly average of power production.

10. The method of claim 1, further comprising determining a subset of the plurality of photovoltaic power inverters by an analysis of evolving errors, the subset corresponding to ones of the plurality of photovoltaic power inverters with an impact on PV power plant forecasting.

11. A photovoltaic system, comprising:
    a plurality of photovoltaic power inverters;
    a plurality of sensing devices individually coupled to ones of the plurality of photovoltaic power inverters; and
    at least one computing device configured to at least:
        collect a plurality of respective average power productions over a period of time from individual ones of the plurality of photovoltaic power inverters;
        generate a plurality of neural networks based at least in part on the plurality of respective average power productions over the period of time, the plurality of neural networks individually corresponding to the plurality of photovoltaic power inverters;
        predict, for each of the plurality of photovoltaic power inverters, a respective inverter solar power generation forecast based at least in part on the plurality of respective average power productions over the period of time; and
        predict a total solar power generation forecast for a photovoltaic system based at least in part on the respective inverter solar power generation forecast.

12. The photovoltaic system of claim 11, wherein each of the plurality of neural networks comprises at least one hidden layer.

13. The photovoltaic system of claim 11, wherein the plurality of neural networks are generated based at least in part on a machine learning algorithm.

14. The photovoltaic system of claim 11, wherein the at least one computing device is further configured to at least determine at least one input parameter, wherein the respective inverter solar power generation forecast for each of the plurality of photovoltaic power inverters is based at least in part on the at least one input parameter.

15. The photovoltaic system of claim 14, wherein the at least one input parameter comprises at least one of a time or a meteorological forecast.

16. The photovoltaic system of claim 11, wherein the total solar power generation forecast is predicted by summing the respective inverter solar power generation forecast for each of the plurality of photovoltaic power inverters.

17. The photovoltaic system of claim 11, wherein an hourly ahead forecasting of respective average power productions corresponds to an hourly average of power production.

18. The photovoltaic system of claim 11, wherein a 24 hour ahead forecasting of respective average power productions corresponds to an hourly average of power production.

19. The photovoltaic system of claim 11, wherein the period of time is greater than or equal to at least one of: a week, a month, and a year.

* * * * *